T861047

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1021

788,071

PHOTOGRAPHIC MATERIALS STABILIZED WITH BENZENE SELENINIC ACID AND TETRAAZAINDENE ANTIFOGGANTS

William Farrell Smith and Dorothy Johnson Beavers, both of Kodak Park Division, Rochester, N.Y. 14650

Filed Dec. 30, 1968. Published Apr. 22, 1969

Class 96—109

No Drawing. 13 Pages Specification

Photographic silver halide emulsions are stabilized against fog with (1) a benzene seleninic acid antifoggant, e.g., benzene seleninic acid salt or free acid and (2) a 4-hydroxy-6-alkyl-1,3,3a,7-tetraazaindene antifoggant, e.g., 4-hydroxy-6-methyl-1,3,3a,7-tetraazaindene. Enhanced activity is obtained when the photographic emulsions or elements disclosed also contain a development modifier which is:

(1) a substantially non-vulcanizable linear polymer containing at least three linear thioether atoms and having a molecular weight of at least about 250,
(2) an onium salt comprising a quaternary ammonium, quaternary phosphonium or ternary sulfonium salt group, or
(3) an alkylene oxide polymer.

Suitable development modifiers include linear condensation products of diols such as 3-thiapentane-1,5-diol with dibasic acids such as glutaric acid, 7,18-diaza-6,19-dioxotetracosane - 1,24 - bis(pyridinium perchlorate) and oleyl ether polyethylene oxide.

Silver halide emulsions and elements stabilized as described can be chemically sensitized, e.g., with noble metal sensitizers alone or in combination with sulfur or selenium sensitizers. They can contain spectral sensitizers, incorporated color-forming couplers, incorporated developing agents, other antifoggants, hardeners, plasticizers, vinyl polymers, coating aids, and other suitable photographic addenda, such as described in U.S. Patent 3,297,446 (columns 4–9).